United States Patent
Joko

(10) Patent No.: US 8,781,513 B2
(45) Date of Patent: Jul. 15, 2014

(54) RADIO COMMUNICATION SYSTEM, RADIO COMMUNICATION DEVICE, AND RADIO COMMUNICATION METHOD

(75) Inventor: Shingo Joko, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 807 days.

(21) Appl. No.: 12/995,108

(22) PCT Filed: May 29, 2009

(86) PCT No.: PCT/JP2009/059857
§ 371 (c)(1),
(2), (4) Date: Jan. 20, 2011

(87) PCT Pub. No.: WO2009/145296
PCT Pub. Date: Dec. 3, 2009

(65) Prior Publication Data
US 2011/0117949 A1    May 19, 2011

(30) Foreign Application Priority Data
May 29, 2008  (JP) ................................. 2008-141756

(51) Int. Cl.
*H04W 72/10*  (2009.01)
(52) U.S. Cl.
USPC .......................................... 455/512; 455/454
(58) Field of Classification Search
None
See application file for complete search history.

(56) References Cited

U.S. PATENT DOCUMENTS

| 6,993,343 B2* | 1/2006 | Yoshii et al. ................ 455/452.1 |
| 2005/0141421 A1 | 6/2005 | Ishii et al. |
| 2005/0147078 A1* | 7/2005 | Arima et al. ................... 370/349 |
| 2007/0168827 A1 | 7/2007 | Lohr et al. |

FOREIGN PATENT DOCUMENTS

| JP | 2002-077093 A | 3/2002 |
| JP | 2003-229894 A | 5/2003 |
| JP | 2005-039726 A | 2/2005 |
| JP | 2004-007087 A | 1/2006 |
| JP | 2007-517431 A | 6/2007 |
| JP | 2007-325115 A | 12/2007 |

OTHER PUBLICATIONS

International Search Report dated Sep. 1, 2009, issued by the Japanese Patent Office for International Application No. PCT/JP2009/059857.
Notification of Reasons for Refusal dated Oct. 25, 2011, issued for counterpart Japanese Application No. 2008-141756.
Notice of Grounds for Rejection dated Sep. 30, 2011, issued for counterpart Korean Application No. 10-2010-7027188.

* cited by examiner

*Primary Examiner* — Philip Sobutka
(74) *Attorney, Agent, or Firm* — Procopio, Cory, Hargreaves & Savitch LLP

(57) ABSTRACT

A radio base station (1) includes a scheduler (114) and a control unit (112). As a reception device has a higher reception quality, the scheduler (114) sets a higher allocation priority of a radio resource used for data transmission. When the priority β set for a transmission destination reception device by the scheduler (114) is higher than the priority α set for transmission destination reception device, the controller (112) allocates the radio resource to both of the transmission destination reception device and the transmission destination reception device ant transmits both of the transmission data and the retransmission data by using the allocated radio resource.

11 Claims, 5 Drawing Sheets

FIG. 3B Max CIR
FIG. 3C PF

FIG. 4A
FIG. 4B
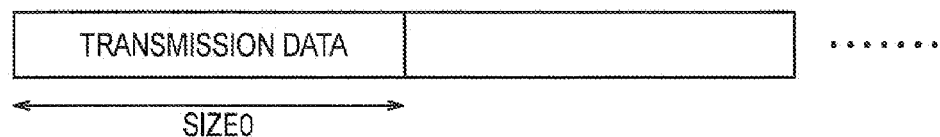
FIG. 4C
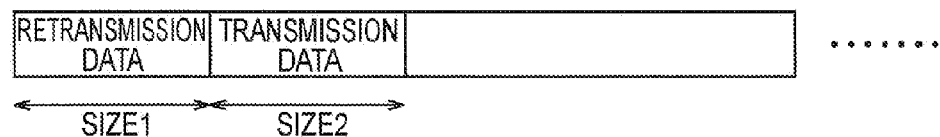
FIG. 5
| CQI | SNR(dB) |
|---|---|
| 0 | -5 |
| 1 | 0 |
| 2 | 2 |
| 3 | 5 |
| 4 | 8 |
| 5 | 10 |
| 6 | 14 |
| 7 | 18 |

FIG. 6

| MODULATION CLASS | MODULATION SCHEME (AND CODED RATIO) | | | | | SNR (THRESHOLD) |
|---|---|---|---|---|---|---|
| | Bits/Sym | Signal Set | Puncture | Shaper | Block Code | |
| 0 | 0.5 | π/2-BPSK | repeat | — | — | $SINR_0$ |
| 1 | 0.67 | π/2-BPSK | 1 of 4 | — | — | $SINR_1$ |
| 2 | 1.0 | QPSK | — | — | — | $SINR_2$ |
| 3 | 1.5 | QPSK | 2 of 6 | — | — | $SINR_3$ |
| 4 | 2.0 | 8-PSK | — | — | (64,57) | $SINR_4$ |
| 5 | 2.5 | 8-PSK | — | — | (64,57) | $SINR_5$ |
| 6 | 3 | 12-QAM | 2 of 6 | 3/4 | (48,47) | $SINR_6$ |
| 7 | 3.5 | 16-QAM | 2 of 6 | 3/4 | (64,63) | $SINR_7$ |
| 8 | 4 | 24-QAM | 2 of 6 | 3/4 | (80,79) | $SINR_8$ |

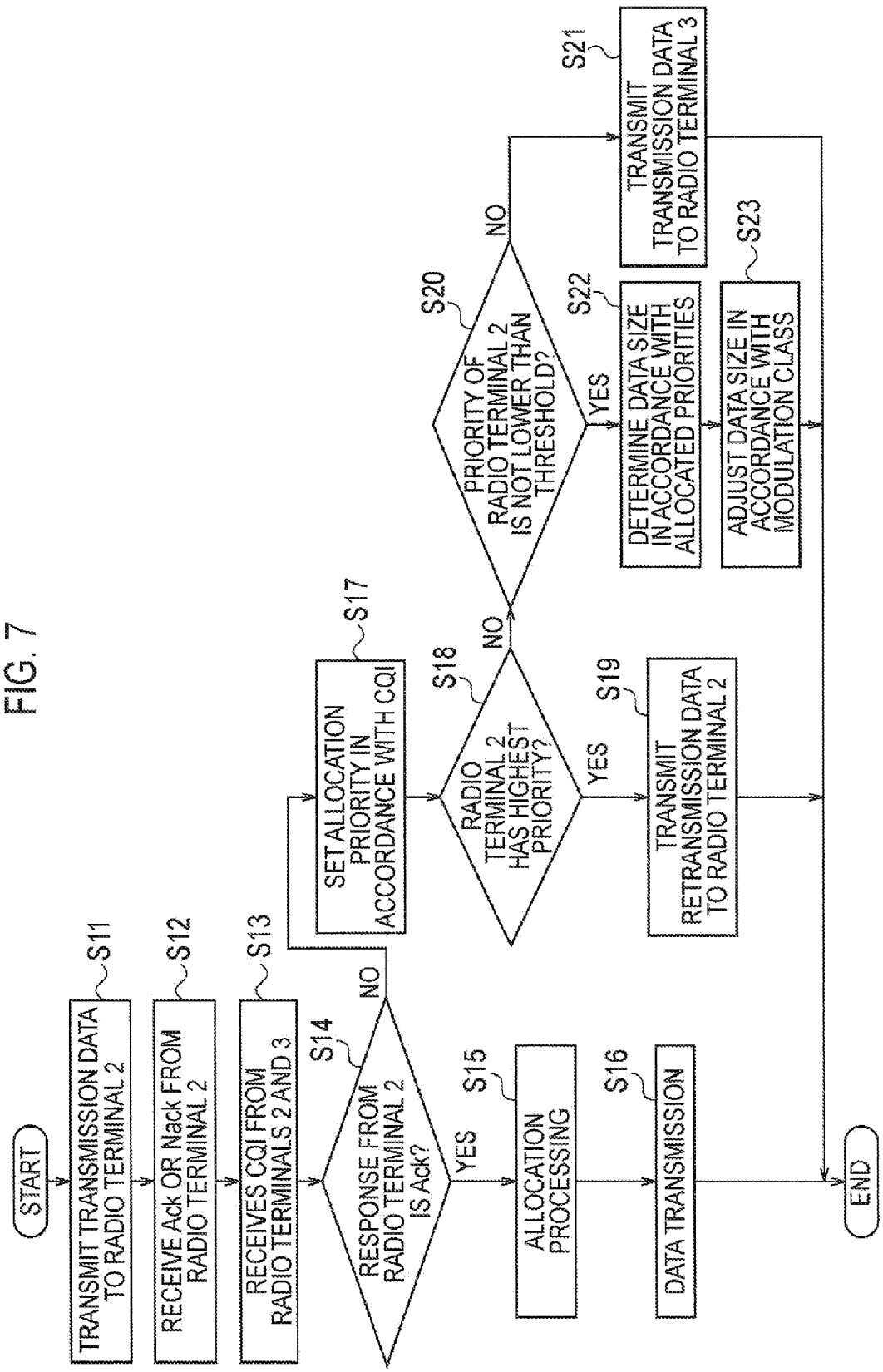

RADIO COMMUNICATION SYSTEM, RADIO COMMUNICATION DEVICE, AND RADIO COMMUNICATION METHOD

TECHNICAL FIELD

The present invention relates to a radio communication system, radio communication device and radio communication method to which hybrid automatic repeat request is applied.

BACKGROUND ART

Generally, transmission errors occur more frequently in a radio communication system than in a wireline communication system. To ensure reliability in communication in such a radio communication system, hybrid automatic repeat request (HARQ) in which both of automatic repeat request (ARQ) and forward error correction (FEC) are used is widely employed in recent years.

In HARQ, in a case where a reception-side radio communication device (called reception device below) fails to decode data received from a transmission-side radio communication device (called transmission device below), the reception device transmits a retransmission request to the transmission device. Upon receipt of the retransmission request, the transmission device transmits the already-transmitted transmission data (initial transmission data) as retransmission data to the reception device.

The reception device stores the transmission data for which decoding had failed, and upon receipt of the retransmission data from the transmission device, combines the stored transmission data with the received retransmission data and decodes the resultant data. This leads to improvement in the error correction capability. The transmission device and reception device thus store transmission data until HARQ retransmission processing is completed.

Moreover, in a case where a transmission device such as a radio base station communicates with multiple reception devices such as radio terminals, the transmission device is provided with a scheduler which controls allocation of a radio resource such as time or frequencies to the multiple reception devices, according to receiving quality (a received SNR, for example) of each of the reception devices. Normally, the scheduler sets a high allocation priority (called priority below) for a reception device of high receiving quality, so that data can be transmitted by preferentially using a radio resource of high receiving quality. Hence, radio resource is utilized effectively and throughput is improved.

In a case where the aforementioned HARQ is applied to a transmission device including such a scheduler, for reduction of the amount of stored transmission data and retransmission delay, the transmission device generally transmits retransmission data with first priority regardless of priorities set by the scheduler (refer to Patent Document 1, for example).

Patent Document 1: Japanese Patent Application Publication No. 2005-39726 (see paragraphs [0028], [0029] and the like)

DISCLOSURE OF THE INVENTION

However, the conventional method of transmitting retransmission data with first priority has the following problem. To be specific, as a result of transmitting retransmission data with first priority, transmission of transmission data to a reception device for which a high priority is set by the scheduler is delayed.

Although the scheduler sets a high priority for a reception device of high receiving quality as mentioned earlier, receiving quality is unstable in radio communication, and the receiving quality may be deteriorated at the delayed point of transmission of the transmission data. In other words, if retransmission data is always transmitted with first priority, there is a problem that the scheduler may not function effectively.

In particular, since a radio communication system employing HARQ is configured to actively perform retransmission in expectation of improvement in error correction capability, retransmission is performed frequently and the problem becomes prominent.

Hence, the present invention has been made to solve the above problem, and has an objective to provide a radio communication system, radio communication device, and radio communication method which allow a scheduler to function effectively by operating in the following manner. In a case where HARQ retransmission is performed, retransmission data is preferentially transmitted to a reception device requesting retransmission while delay of transmission of transmission data to a reception device of high receiving quality is avoided.

In order to solve the above problem, the present invention has the following aspects. A first aspect of the present invention is a radio communication system (radio communication system 10) comprising: a radio communication device (radio base station 1) configured to perform radio communication with a plurality of reception devices (for example, retransmission destination radio terminal 2 and transmission destination radio terminal 3); a transmission destination reception device (transmission destination radio terminal 3) constituting one of the reception devices and being a transmission destination of transmission data for which retransmission is not requested; and a retransmission destination reception device (retransmission destination radio terminal 2) constituting one of the reception devices and being a transmission destination of retransmission data for which retransmission is requested, wherein: the radio communication device includes an information receiver (transmission and reception unit 111) configured to receive from each of the reception devices receiving quality information indicating receiving quality of a radio signal transmitted by the radio communication device, a transmission processor (controller 112) configured to allocate a radio resource used for data transmission to any of the reception devices and transmits at least one of the transmission data and the retransmission data by use of the allocated radio resource, and a priority setting unit (scheduler 114) configured to set for each of the reception devices a priority with which the transmission processor allocates the radio resource, the priority being set according to the receiving quality information received by the information receiver; the higher the receiving quality a reception device has, the higher the priority setting unit sets the priority therefor; and if a first priority (priority β) set for the transmission destination reception device by the priority setting unit is higher than a second priority (priority α) set for the retransmission destination reception device by the priority setting unit, the transmission processor allocates the radio resource to both of the transmission destination reception device and the retransmission destination reception device as well as transmits both of the transmission data and the retransmission data by use of the allocated radio resource.

According to such a radio communication system, if a first priority set for the transmission destination reception device by the priority setting unit is higher than a second priority set for the retransmission destination reception device by the priority setting unit, the transmission processor allocates the radio resource to both of the transmission destination reception device and the retransmission destination reception device as well as transmits both of the transmission data and the retransmission data by use of the allocated radio resource. Accordingly, the scheduler (priority setting unit) can be caused to function effectively when the radio communication device preferentially transmits retransmission data to the reception device requesting retransmission while avoiding delay of transmission of transmission data to the reception device of high reception quality.

A second aspect of the present invention is a radio communication device (radio base station 1) which performs radio communication with a plurality of reception devices including a transmission destination reception device being a transmission destination of transmission data for which retransmission is not requested, and a retransmission destination reception device being a transmission destination of retransmission data for which retransmission is requested, the radio communication device comprising: an information receiver (transmission and reception unit 111) configured to receive from each of the reception devices receiving quality information indicating receiving quality of a radio signal transmitted by the radio communication device; a transmission processor (controller 112) configured to allocate a radio resource used for data transmission to any of the reception devices and transmit at least one of the transmission data and the retransmission data by use of the allocated radio resource; and a priority setting unit (scheduler 114) configured to set for each of the reception devices a priority with which the transmission processor allocates the radio resource, the priority being set according to the receiving quality information received by the information receiver, wherein the higher the receiving quality a reception device has, the higher the priority setting unit sets the priority therefor; and if a first priority (priority β) set for the transmission destination reception device by the priority setting unit is higher than a second priority (priority α) set for the retransmission destination reception device by the priority setting unit, the transmission processor allocates the radio resource to both of the transmission destination reception device and the retransmission destination reception device as well as transmits both of the transmission data and the retransmission data by use of the allocated radio resource.

A third aspect of the present invention is the second aspect of the present invention further comprising a size determination unit (data size controller 115) configured to determine a size of each of the transmission data and the retransmission data to be transmitted by the transmission processor, the sizes being determined according to a ratio between the first priority and the second priority, if the first priority set for the transmission destination reception device is higher than the second priority set for the retransmission destination reception device.

A fourth aspect of the present invention is the third aspect of the present invention further comprising the radio communication device, wherein the size determination unit makes a size of the retransmission data smaller than a size of initial transmission data corresponding to the retransmission data to be transmitted to the retransmission destination reception device, and determines a difference between the size of the initial transmission data corresponding to the retransmission data and the size of the retransmission data as a size of the transmission data to be transmitted to the transmission destination reception device.

A fifth aspect of the present invention is the fourth aspect of the present invention further comprising the radio communication device, wherein the size determination unit determines a size D of the retransmission data in accordance with $D = C \times (B/(A+B))$ where A is the first priority set for the transmission destination reception device, B is the second priority set for the retransmission destination reception device, and C is the size of the initial transmission data corresponding to the retransmission data.

A sixth aspect of the present invention is the second aspect of the present invention further comprising a modulation scheme determination unit (controller 112) configured to determine, according to the receiving quality information received by the information receiver, a first modulation scheme used for data transmission to the transmission destination reception device and a second modulation scheme used for data transmission to the retransmission destination reception device; and a size determination unit (data size controller 115) configured to determine a size of each of the transmission data and the retransmission data in accordance with the first modulation scheme and the second modulation scheme determined by the modulation scheme determination unit.

A seventh aspect of the present invention is the third aspect of the present invention further comprising a modulation scheme determination unit (controller 112) configured to determine, according to the receiving quality information received by the information receiver, a first modulation scheme used for data transmission to the transmission destination reception device and a second modulation scheme used for data transmission to the retransmission destination reception device; and a size adjustment unit (data size controller 115) configured to adjust a size of each of the transmission data and the retransmission data determined by the size determination unit, the size adjusted in accordance with the first modulation scheme and the second modulation scheme determined by the modulation scheme determination unit.

A eighth aspect of the present invention is the third aspect of the present invention further comprising the radio communication device, wherein the size adjustment unit reduces the size of the retransmission data determined by the size determination unit and increases the size of the transmission data determined by the size determination unit, if an amount of information per symbol defined in the second modulation scheme is less than an amount of information per symbol defined in the first modulation scheme; and the size adjustment unit increases the size of the retransmission data determined by the size determination unit and reduces the size of the transmission data determined by the size determination unit, if the amount of information per symbol defined in the second modulation scheme is larger than the amount of information per symbol defined in the first modulation scheme.

A ninth aspect of the present invention is the second aspect of the present invention further comprising the radio communication device, wherein if the first priority set for the transmission destination reception device is higher than the second priority set for the retransmission destination reception device and the second priority set for the retransmission destination reception device is lower than a certain threshold, the transmission processor allocates the radio resource only to the transmission destination reception device as well as transmits only the transmission data by use of the allocated radio resource.

A tenth aspect of the present invention is the second aspect of the present invention further comprising the radio communication device, wherein if the first priority set for the transmission destination reception device is lower than the second priority set for the retransmission destination reception device, the transmission processor allocates the radio resource only to the retransmission destination reception device as well as transmits only the retransmission data by use of the allocated radio resource.

A eleventh aspect of the present invention is a radio communication method applied to a radio communication device which performs radio communication with a plurality of reception devices including a transmission destination reception device being a transmission destination of transmission data for which retransmission is not requested, and a retransmission destination reception device being a transmission destination of retransmission data for which retransmission is requested, the radio communication method comprising the steps of: receiving from each of the reception devices receiving quality information indicating receiving quality of a radio signal transmitted by the radio communication device; allocating a radio resource used for data transmission to any of the reception devices; transmitting at least one of the transmission data and the retransmission data by use of the radio resource allocated in the allocating step; and setting for each of the reception devices a priority with which the radio resource is allocated in the allocating step, the priority being set according to the receiving quality information received in the receiving step, wherein in the setting step, the higher the receiving quality a reception device has, the higher the priority therefor is set; in the allocating step, if a first priority set for the transmission destination reception device in the setting step is higher than a second priority set for the retransmission destination reception device in the setting step, the radio resource is allocated to both of the transmission destination reception device and the retransmission destination reception device; and in the transmitting step, if the radio resource is allocated to both of the transmission destination reception device and the retransmission destination reception device, both of the transmission data and the retransmission data are transmitted by use of the allocated radio resource.

According to the present invention, provided is a radio communication system, radio communication device and radio communication method which allow a scheduler to function effectively by preferentially transmitting retransmission data to a reception device requesting retransmission while avoiding delay of transmission of transmission data to a reception device of high receiving quality in a case where HARQ retransmission is performed.

BRIEF DESCRIPTION OF THE DRAWINGS

FIG. 4 is a conceptual diagram for explaining data size determination processing and data size adjustment processing according to the embodiment of the present invention.

FIG. 5 is a diagram showing an example of association between CQI and received SNR.

FIG. 6 is a diagram for explaining modulation schemes used in adaptive modulation.

FIG. 7 is a flowchart showing an operation of the radio base station according to the embodiment of the present invention.

BEST MODE FOR CARRYING OUT THE INVENTION

Figure 1:
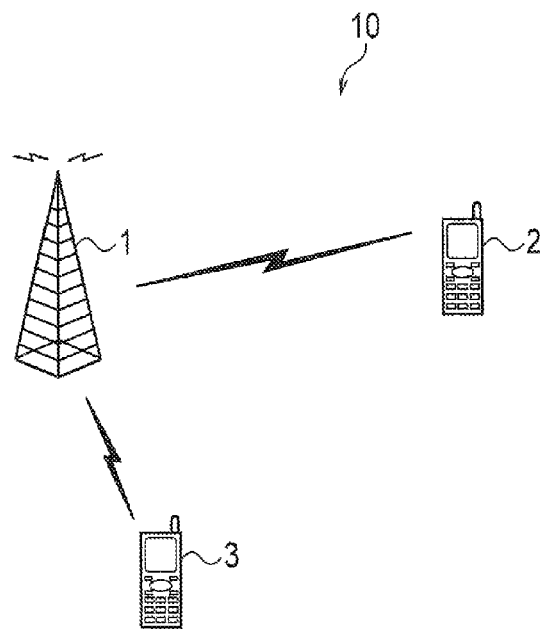
FIG. 1 is an overall schematic configuration diagram of a radio communication system according to an embodiment of the present invention.

Next, a radio communication system according to an embodiment of the present invention will be described with reference to the drawings. Specifically, descriptions will be given of (1) an overall schematic configuration of the radio communication system, (2) a configuration of a radio base station, (3) an example of priority setting processing, (4) an example of data size determination and adjustment processing, (5) an operation of the radio base station, (6) advantageous effects, and (7) other embodiments. In the following descriptions of the drawings in the embodiments, the same or similar reference numerals are given to the same or similar parts.

(1) Overall Schematic Configuration of Radio Communication System

FIG. 1 is an overall schematic configuration diagram of a radio communication system 10 according to this embodiment. As shown in FIG. 1, the radio communication system 10 includes a radio base station 1, a radio terminal 2 and a radio terminal 3.

The radio terminal 2 and radio terminal 3 are positioned within a service area of the radio base station 1, and communicate with the radio base station 1 via radio intervals. Although only a total of two radio terminals which are the radio terminal 2 and radio terminal 3 are shown in the example in FIG. 1, multiple radio terminals may communicate with the radio base station 1.

In this embodiment, the radio terminal 2 and radio terminal 3 constitute multiple reception devices which receive data from the radio base station 1. The radio base station 1 constitutes a radio communication device which performs radio communication with the multiple reception devices.

The radio terminal 2 and radio terminal 3 periodically measure receiving quality of a radio signal transmitted from the radio base station 1, that is specifically, of a pilot signal being a broadcast signal, and periodically transmit receiving quality information indicating the receiving qualities thereof to the radio base station 1. In this embodiment, the receiving quality measured by the radio terminal 2 and radio terminal 3 is a received SNR (Signal to Interference plus noise power Ratio). Hereinafter, the receiving quality information transmitted by the radio terminal 2 and radio terminal 3 is referred to as CQI (Channel Quality Indicator).

The radio communication system 10 employs the aforementioned HARQ. In this embodiment, the radio terminal 2 fails to decode initial transmission data received from the radio base station 1, and transmits a Nack, which is a negative response message for requesting retransmission of the initial transmission data, to the radio base station 1. Specifically, the radio terminal 2 is a transmission destination of the retransmission data for which retransmission is requested, and the radio terminal 3 is a transmission destination of transmission data for which retransmission is not requested (initial transmission data).

Note that in general HARQ, the reception side transmits to the transmission side a positive response message (Ack) indicating success of decoding when data (data packet) transmitted from the transmission side is successfully decoded, or a negative response message (Nack) indicating failure of the decoding when the decoding fails.

Hereinafter, the radio terminal 2 being the transmission destination of the retransmission data for which retransmission is requested is referred to as "retransmission destination radio terminal 2" as appropriate. Meanwhile, the radio terminal 3 being the transmission destination of the transmission data for which retransmission is not requested is referred to as "transmission destination radio terminal 3" as appropriate.

The radio base station 1 allocates a radio resource to each of the retransmission destination radio terminal 2 and transmission destination radio terminal 3 in accordance with a CQI received from each of the retransmission destination radio terminal 2 and transmission destination radio terminal 3. The radio base station 1 then transmits data to the retransmission destination radio terminal 2 and transmission destination radio terminal 3 by use of the allocated radio resource. Here, a radio resource used for data transmission refers to a transmission time frame (called transmission slot below), a frequency channel or the like. In the following embodiment, for simplifying the description, a transmission slot is cited as an example of the radio resource allocated by the radio base station 1 in the description.

In addition, the radio communication system 10 employs the adaptive modulation scheme for improvement of the communication rate. The radio base station 1 dynamically switches the modulation schemes (called "modulation classes" below as appropriate) according to a CQI received from each of the retransmission destination radio terminal 2 and transmission destination radio terminal 3. To be specific, the radio base station 1 selects an appropriate modulation scheme from among multiple modulation schemes such as BPSK (Binary Phase Shift Keying) and 24 QAM (Quadrature Amplitude Modulation).

In HARQ, retransmission gain can be obtained by combining transmission data (initial transmission data) and retransmission data. Particularly, performance of the system as a whole can be enhanced by selecting a high modulation class in expectation of the retransmission gain, instead of selecting a low modulation class to complete transmission of the whole data in one transmission. For this reason, retransmission is frequently performed in this type of system.

(2) Configuration of Radio Base Station

Figure 2:
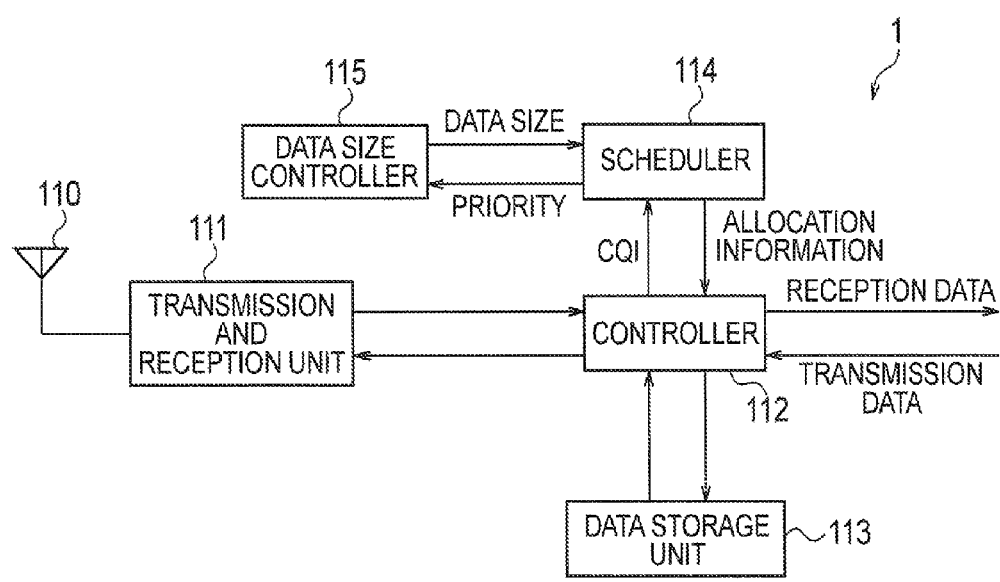
FIG. 2 is a functional block configuration diagram of a radio base station according to the embodiment of the present invention.

Next, a configuration of the radio base station 1 will be described. FIG. 2 is a functional block configuration diagram of the radio base station 1.

As shown in FIG. 2, the radio base station 1 includes an antenna 110, a transmission and reception unit 111, a controller 112, a data storage unit 113, a scheduler 114 and a data size controller 115.

The transmission and reception unit 111 transmits and receives radio signals including data, via the antenna 110. In this embodiment, the transmission and reception unit 111 constitutes an information receiver which receives a CQI indicating a received SNR of the radio signal transmitted from the radio base station 1, from each of the radio terminals 2 and 3.

The data storage unit 113 temporarily stores transmission data to be transmitted to the radio terminals 2 and 3, as well as stores already-transmitted transmission data until receipt of a positive response message (Ack) indicating successful reception of the data.

The controller 112 has control over the entire operation of the radio base station 1. To be specific, the controller 112 controls data transmission and data reception to and from the radio terminals 2 and 3. In this embodiment, the controller 112 constitutes a transmission processor which allocates a radio resource to be used for data transmission to any of the radio terminals 2 and 3, and transmits transmission data or retransmission data by use of the allocated radio resource.

Further, the controller 112 constitutes a modulation scheme determination unit which determines a first modulation scheme to be used for data transmission to the transmission destination radio terminal 3 and a second modulation scheme to be used for data transmission to the retransmission destination radio terminal 2, the determination being made according to the CQI received by the transmission and reception unit 111.

According to the above CQI, the scheduler 114 sets for each radio terminal a priority with which the controller 112 allocates a radio resource. Hereinafter, a priority (second priority) set for the retransmission destination radio terminal 2 by the scheduler 114 is referred to as "priority α," and a priority (first priority) set for the transmission destination radio terminal 3 by the scheduler 114 is referred to as "priority β." Details of the scheduler 114 will be described later.

Here, if the priority β set for the transmission destination radio terminal 3 is higher than at least the priority α set for the retransmission destination radio terminal 2, the controller 112 allocates radio resource to both of the transmission destination radio terminal 3 and retransmission destination radio terminal 2, and transmits both of the transmission data and retransmission data by use of the allocated radio resource.

Meanwhile, if the priority β set for the transmission destination radio terminal 3 is higher than the priority α set for the retransmission destination radio terminal 2, and the priority α set for the retransmission destination radio terminal 2 is lower than a certain threshold, the controller 112 allocates a radio resource only to the transmission destination radio terminal 3 and transmits only the transmission data by use of the allocated radio resource.

Meanwhile, if the priority β set for the transmission destination radio terminal 3 is lower than the priority α set for the retransmission destination radio terminal 2, the controller 112 allocates a radio resource only to the retransmission destination radio terminal 2 and transmits only the retransmission data by use of the allocated radio resource.

If the priority β set for the transmission destination radio terminal 3 is higher than the priority α set for the retransmission destination radio terminal 2, the data size controller 115 determines a size of each of the transmission data and retransmission data to be transmitted according to a ratio between the priority β and priority α.

Moreover, the data size controller 115 adjusts the determined size of each of the transmission data and retransmission data in accordance with the first modulation scheme and second modulation scheme determined by the controller 112. Thus, the data size controller 115 constitutes a size determination unit which determines the size of each of the transmission data and retransmission data, as well as constitutes a size adjustment unit which adjusts the determined size of each of the transmission data and retransmission data.

(3) Example of Priority Setting Processing

Figure 3A:
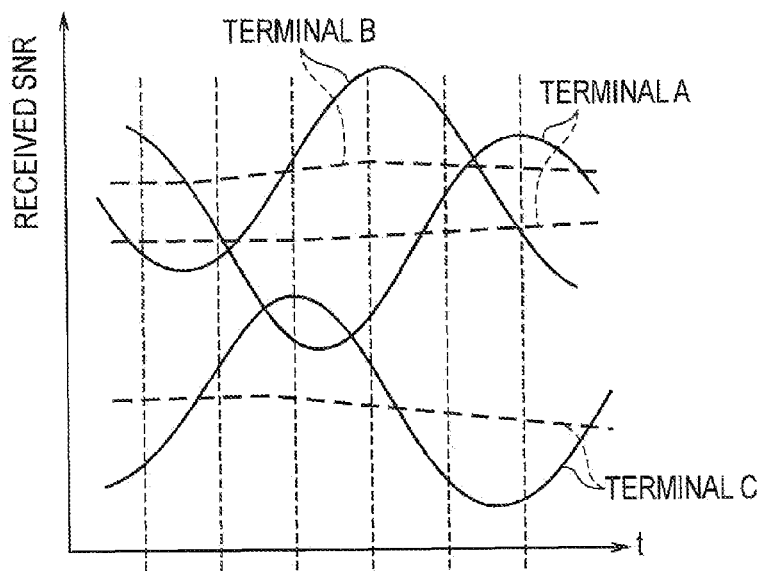
FIG. 3 is a diagram for explaining an example of priority setting processing according to the embodiment of the present invention.
Figure 3A:
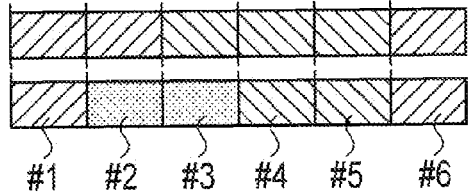

Next, an example of priority setting processing performed by the scheduler 114 will be described. FIG. 3 is a diagram for explaining the example of the priority setting processing.

In FIG. 3, a description will be given by taking, as an example, a case where the scheduler 114 sets an allocation priority of radio resource to each of three radio terminals A to C.

As described above, in the radio communication system 10, the scheduler 114 is used so that the radio base station 1 may manage the multiple radio terminals and effectively utilize radio resource. The scheduler 114 sets each of the priorities according to a CQI which indicates an instantaneous received SNR. Schemes for the scheduler 114 include the Max CIR scheme and PF (proportional fair) scheme.

In the Max CIR scheme, a high priority is set for a radio terminal having a high instantaneous received SNR (called instantaneous received SNR below). In the example in FIG. 3, the radio terminal A has the highest instantaneous received SNR in transmission slots #1, #2 and #6, whereas the radio terminal B has the highest instantaneous received SNR in transmission slots #3 to 5. Note that the solid line in FIG. 3(a) represents the instantaneous received SNR, and the broken line in FIG. 3(a) represents an average value of the instantaneous received SNRs (called average received SNR below).

Hence, if the scheduler 114 employs the Max CIR scheme, as shown in FIG. 3(b), the radio terminal A is given the highest priority in the transmission slots #1, #2 and #6, while the radio terminal B is given the highest priority in the transmission slots #3 to 5.

On the other hand, in the PF scheme, a high priority is set for a radio terminal whose instantaneous received SNR is relatively higher than an average received SNR. Specifically, in the PF scheme, the scheduler 114 computes a priority by solving priority=DRC/R. Here, DRC represents an instantaneous data rate computed from a CQI, and R represents a value obtained by averaging data rates by an exponentially weighted average or the like using a certain time constant. Accordingly, a ratio of an instantaneous data rate (instantaneous received SNR) to an average rate (average received SNR) is computed as the priority.

If the scheduler 114 employs PF, as shown in FIG. 3(c), the radio terminal A is given the highest priority in the transmission slots #1 and #6, the radio terminal C is given the highest priority in the transmission slots #2 and #3, and the radio terminal B is given the highest priority in the transmission slots #4 and #5.

Thus, as compared to the Max CIR scheme, the PF scheme can more equally provide transmission opportunities to multiple radio terminals. In the following embodiment, a case where the scheduler 114 employs the PF scheme will be described.

(4) Example of Data Size Determination and Adjustment Processing

As has been described, if the priority β set for the transmission destination radio terminal 3 is higher than at least the priority α set for the retransmission destination radio terminal 2, the controller 112 allocates radio resource (transmission slots in this embodiment) to both of the transmission destination radio terminal 3 and retransmission destination radio terminal 2, and transmits both of the transmission data and retransmission data by use of the allocated radio resource. At this time, the data size controller 115 determines the size of each of the transmission data and retransmission data to be transmitted, the determination being made according to a ratio between the priority β and priority α.

Hereinafter, a description will be given with reference to FIG. 4 of data size determination processing and data size adjustment processing performed by the data size controller 115.

As shown in FIGS. 4(b) and (c), the data size controller 115 makes a size SIZE1 of retransmission data smaller than a size SIZE0 of initial transmission data corresponding to the retransmission data to be transmitted to the retransmission destination radio terminal 2.

Then, as shown in FIG. 4(c), the data size controller 115 determines a difference between the size SIZE0 of the initial transmission data corresponding to the retransmission data to be transmitted to the retransmission destination radio terminal 2 and the size SIZE1 of the retransmission data (SIZE0-SIZE1) as a size SIZE2 of transmission data to be transmitted to the transmission destination radio terminal 3. Accordingly, the following relationship holds for the size SIZE0 of the initial transmission data corresponding to the retransmission data to be transmitted to the retransmission destination radio terminal 2, the size SIZE1 of the retransmission data, and the size SIZE2 of the transmission data to be transmitted to the transmission destination radio terminal 3.

$$SIZE2=SIZE0-SIZE1 \quad (1)$$

In this embodiment, the following relationship holds for the priority β set for the transmission destination radio terminal 3, the priority α set for the retransmission destination radio terminal 2, the size SIZE0 of the initial transmission data corresponding to the retransmission data, and the size SIZE1 of the retransmission data.

$$SIZE1=SIZE0\times(\alpha+\beta) \quad (2)$$

Here, if there are multiple transmission destination radio terminals 3, the priority of the transmission destination radio terminal 3 having the highest priority among the multiple transmission destination radio terminals 3 is set as the priority β.

Next, the data size controller 115 adjusts the sizes (SIZE1 and SIZE2) computed by use of equation (1) and equation (2), in accordance with the first modulation scheme determined by the controller 112 for the transmission destination radio terminal 3 and the second modulation scheme determined by the controller 112 for the retransmission destination radio terminal 2.

Here, the modulation scheme determined by the controller 112 will be briefly described with reference to FIG. 5 and FIG. 6.

As shown in FIG. 5, each CQI is associated with a received SNR. As shown in FIG. 6, each modulation class is associated with a received-SNR threshold. In the example in FIG. 6, a total of nine modulation classes of modulation classes 0 to 8 are prepared. The modulation class 8 is the highest-rate modulation class, and the modulation class 0 is the lowest-rate modulation class. To be specific, the modulation class 8 employs 24 QAM, whereas the modulation class 0 employs π/2-BPSK. In other words, the amount of information contained in a symbol differs among the modulation classes.

A received-SNR threshold is defined for each modulation class. For example, if a received SNR is larger than a threshold SNR8, the modulation class 8 is applied. If a received SNR is smaller than the threshold SNR8 but larger than a threshold SNR7, the modulation class 7 is applied. Similarly, if a received SNR is smaller than the threshold SNR7 but larger than a threshold SNR6, the modulation class 6 is applied.

The controller 112 thus determines the modulation class. If the amount of information contained in a symbol defined in the second modulation scheme is smaller than the amount of information contained in a symbol defined in the first modulation scheme, the data size controller 115 reduces the size SIZE1 of the retransmission data and increases the size SIZE2 of the transmission data, the sizes SIZE1 and SIZE2 having been computed by use of the equation (1) and equation (2).

On the other hand, if the amount of information contained in a symbol defined in the second modulation scheme used for data transmission to the retransmission destination radio terminal 2 is larger than the amount of information contained in a symbol defined in the first modulation scheme used for data transmission to the transmission destination radio terminal 3, the data size controller 115 increases the size SIZE1 of the retransmission data and reduces the size SIZE2 of the transmission data, the sizes SIZE1 and SIZE2 having been computed by use of the equation (1) and equation (2).

Note that the total of the size SIZE1 of the retransmission data and size SIZE2 of the transmission data does not vary before and after the size adjustment.

Specifically, the data size controller 115 sets the modulation class (second modulation scheme) for the retransmission destination radio terminal 2 to X bits per symbol, and sets the modulation class for the transmission destination radio terminal 3 to Y bits per symbol. Then, the size of the retransmission data to the retransmission destination radio terminal 2 is assumed to be $((100 \times \alpha/(\alpha+\beta) \times (X/(X+Y)) + (100-100 \times \alpha/(\alpha+\beta)) \times (Y/(X+Y))$ % of SIZE0 of the initial transmission packet size.

(5) Operation of Radio Base Station

Next, an operation of the radio base station 1 will be described. FIG. 7 is a flowchart showing the operation of the radio base station 1.

In step S11, the scheduler 114 and the controller 112 allocate a radio resource (a transmission slot in this embodiment) to the retransmission destination radio terminal 2 in accordance with a CQI of the retransmission destination radio terminal 2 and a CQI of the transmission destination radio terminal 3, and transmit transmission data to the retransmission destination radio terminal 2.

The retransmission destination radio terminal 2 performs decoding after receiving transmission data from the radio base station 1, carries out a CRC check, and transmits an Ack as a response message to the radio base station 1 if the data is successfully decoded and transmits a Nack as a response message if the data is not successfully decoded.

In step S12, the transmission and reception unit 111 receives the response message (Ack or Nack) from the retransmission destination radio terminal 2. In addition, the transmission and reception unit 111 receives a CQI from each of the radio terminals 2 and 3 (step S13).

In step S14, the controller 112 judges whether the response message received by the transmission and reception unit 111 is an Ack or a Nack. If the response message is an Ack, the processing proceeds to step S15, and if the response message is a Nack, the processing proceeds to step S17.

In step S15 and step S16, the scheduler 114 and the controller 112 normally performs allocation processing and transmission processing for the next data.

In step S17 being the case where the response message is a Nack, the scheduler 114 sets, by use of the aforementioned PF scheme, a priority with which the controller 112 allocates a radio resource for each radio terminal.

In step S18, the controller 112 judges whether or not the priority $\alpha$ set for the retransmission destination radio terminal 2 by the scheduler 114 indicates the highest priority. In other words, the controller 112 judges whether or not the priority $\alpha$ set for the retransmission destination radio terminal 2 is higher than the priority $\beta$ set for the transmission destination radio terminal 3.

If the priority $\alpha$ set for the retransmission destination radio terminal 2 indicates the highest priority, the processing proceeds to step S19, and if the priority $\alpha$ does not indicate the highest priority, the processing proceeds to step S20.

In step S19, the controller 112 allocates a radio resource only to the retransmission destination radio terminal 2, and transmits only the retransmission data by use of the allocated radio resource. Specifically, the controller 112 acquires retransmission data to the retransmission destination radio terminal 2 from the data storage unit 113, and transmits the acquired retransmission data via the transmission and reception unit 111.

In step S20, the controller 112 judges whether or not the priority $\alpha$ set for the retransmission destination radio terminal 2 is not lower than a threshold. For example, in the PF scheme, this threshold is set to 0.5 where an instantaneous received SNR (instantaneous data rate) is only about half of the average received SNR (average data rate).

If the priority $\alpha$ set for the retransmission destination radio terminal 2 is not lower than the threshold, the processing proceeds to step S22, and if the priority $\alpha$ is lower than the threshold, the processing proceeds to step S21.

In step S21, the controller 112 allocates a radio resource only to the transmission destination radio terminal 3, and transmits only the transmission data by use of the allocated radio resource. Specifically, the controller 112 acquires transmission data to the transmission destination radio terminal 3 from the storage unit 113, and transmits the acquired transmission data via the transmission and reception unit 111.

In step S22 and step S23, the data size controller 115 performs data size determination processing in accordance with the priority $\alpha$ and priority $\beta$ by the procedure described in the above "(4) Example of Data size Determination and Adjustment Processing," and then performs data size adjustment processing in accordance with the modulation class.

(6) Advantageous Effects

As has been described, in a case where the priority $\beta$ set for the transmission destination radio terminal 3 by the scheduler 114 is higher than the priority $\alpha$ set for the retransmission destination radio terminal 2, the controller 112 of the radio base station 1 allocates radio resource to both of the transmission destination radio terminal 3 and retransmission destination radio terminal 2, as well as transmits both of the transmission data and the retransmission data by use of the allocated radio resource.

Hence, the scheduler 114 can be caused to function effectively when the radio base station 1 preferentially transmits retransmission data requested to be retransmitted to the retransmission destination radio terminal 2 while avoiding delay of transmission of transmission data to the transmission destination radio terminal 3 having a high received SNR.

To be specific, the data size controller 115 makes the size SIZE1 of retransmission data smaller than the size SIZE0 of the initial transmission data corresponding to the retransmission data to be transmitted to the retransmission destination radio terminal 2. Then, the data size controller 115 determines the difference between the size SIZE0 of the initial transmission data corresponding to the retransmission data to be transmitted to the retransmission destination radio terminal 2 and the size SIZE1 of the retransmission data (SIZE0-SIZE1) as the size SIZE2 of the transmission data to be transmitted to the transmission destination radio terminal 3.

Accordingly, when a single radio resource is shared by transmission data and retransmission data, both of the transmission data and the retransmission data can be transmitted by utilizing the radio resource to the full extent.

In this embodiment, the data size controller 115 determines the size of the retransmission data in accordance with the equation (2), and thus the size of the retransmission data can be determined by reflecting the priorities set by the scheduler 114.

In this embodiment, the data size controller 115 is capable of adjusting the determined size of each of the transmission data and retransmission data in accordance with the modulation scheme. For this reason, in a case where a high-rate modulation scheme is employed, data is transmitted as much as possible so as to efficiently utilize radio resource and improve the throughput.

In this embodiment, if the priority $\beta$ set for the transmission destination radio terminal 3 is higher than the priority $\alpha$ set for the retransmission destination radio terminal 2 and the priority $\alpha$ set for the retransmission destination radio terminal 2 is lower than the certain threshold, the controller 112 allocates a radio resource only to the transmission destination radio terminal 3 and transmits only the transmission data by use of the allocated radio resource.

In this embodiment, if the priority $\beta$ set for the transmission destination radio terminal 3 is lower than the priority $\alpha$ set for the retransmission destination radio terminal 2, the controller 112 allocates a radio resource only to the retransmission destination radio terminal 2 and transmits only the transmission data by use of the allocated radio resource.

In other words, even in a case where retransmission by HARQ is performed, the priority set by the scheduler 114 is considered important, and the scheduler 114 can be caused to function effectively.

(7) Other Embodiments

Although the present invention has been described through the embodiment as described above, it should not be construed that the descriptions and drawings constituting a part of this disclosure will limit the present invention. Various alternative embodiments, examples, and operation techniques will be apparent to those skilled in the art from this disclosure.

In the above embodiment, the data size controller 115 adjusts the size of each of the transmission data and retransmission data computed using the equation (2), in accordance with the modulation scheme. However, the data size controller 115 may omit the size computation by use of the equation (2), and determine the size of each of the transmission data and retransmission data in accordance only with the modulation scheme.

Although a received SNR is used as the receiving quality in the above embodiment, the invention is not limited to this, and an RSSI (received signal strength indicator), a received BER (bit error rate) or the like may be used.

Further, although the above embodiment has been described on the assumption that HARQ retransmission is performed, the invention is not limited to this, and may also be applied to normal ARQ.

Note that although a portable radio terminal is shown in FIG. 1, a fixed radio terminal or a card-type radio terminal may be used instead. Otherwise, a device that does not have a data transmission function may be used instead of the radio terminal.

As described above, it should be understood that the present invention includes various embodiments or the like which have not been described herein. Therefore, the present invention is limited only by specific features of the invention in the claims which are reasonable from the disclosure.

Note that the entire content of Japanese Patent Application No. 2008-141756 (filed on May 29, 2008) is incorporated herein by reference.

INDUSTRIAL APPLICABILITY

As has been described, the radio communication system, radio communication device and radio communication method according to the present invention have the following effect and is thus advantageous for use in radio communication such as mobile communication. Specifically, provided is a radio communication system, radio communication device and radio communication method which cause a scheduler to function effectively by preferentially transmitting retransmission data to a reception device requesting for retransmission while avoiding delay of transmission of transmission data to a reception device of a high receiving quality, in a case where HARQ retransmission is performed.

The invention claimed is:

1. A radio communication system comprising:
   a radio communication station device configured to perform radio communication with a plurality of communication devices;
   a first communication device constituting one of the plurality of communication devices and being a transmission destination of transmission data for which retransmission is not requested; and
   a second communication device constituting one of the plurality of communication devices and being a transmission destination of retransmission data for which retransmission is requested, wherein:
   the radio communication station device includes
   a setting unit configured to set for each of the plurality of communication devices a priority based on a receiving quality of a signal received at each of the plurality of communication devices from the radio communication station device; and
   a transmission controller configured to control a data transmission to each of the plurality of communication devices based on the priority,
   wherein setting unit sets the priority higher as the receiving quality is higher, and
   if a first priority set for the first communication device is higher than a second priority set for the second communication device, the transmission controller transmits the transmission data to the first communication device and the retransmission data to the second communication device by one radio resource such that first communication device and the second communication device share the one radio resource.

2. A radio communication station device which performs radio communication with a plurality of communication devices including a first communication device being a transmission destination of transmission data for which retransmission is not requested, and a second communication device being a transmission destination of retransmission data for which retransmission is requested, the radio communication station device comprising:
   a setting unit configured to set for each of the plurality of communication devices a priority based on a receiving quality of a signal received at each of the plurality of communication devices from the radio communication station device; and
   a transmission controller configured to control a data transmission to each of the reception devices based on the priority,
   wherein the setting unit sets the priority higher as the receiving quality is higher; and
   if a first priority set for the first communication device is higher than a second priority set for the second communication device, the transmission controller transmits the transmission data to the first communication device and the retransmission data to the second communication device by one radio resource such that first communication device and the second communication device share the one radio resource.

3. The radio communication station device according to claim 2, wherein
the transmission controller determines a size of each of the transmission data and the retransmission data in the one radio resource based on to a ratio between the first priority and the second priority, if the first priority is higher than the second priority.

4. The radio communication station device according to claim 3, wherein
the transmission controller
makes a size of the retransmission data smaller than a size of initial transmission data corresponding to the retransmission data to be transmitted to the second communication device, and
determines a difference between the size of the initial transmission data corresponding to the retransmission data and the size of the retransmission data as a size of the transmission data to be transmitted to the first communication device.

5. The radio communication station device according to claim 4, wherein
the transmission controller determines a size D of the retransmission data in accordance with $$D = C \times (B/(A+B))$$

where A is the first priority set for the first communication device, B is the second priority set for the second communication device, and C is the size of the initial transmission data corresponding to the retransmission data.

6. The radio communication station device according to claim 2, wherein
the transmission controller
determines, according to the receiving quality, a first modulation scheme used for data transmission to the first communication device and a second modulation scheme used for data transmission to the second communication device; and
determines a size of each of the transmission data and the retransmission data in accordance with the determined first modulation scheme and the determined second modulation scheme.

7. The radio communication station device according to claim 3, wherein
the transmission controller
determines, according to the receiving quality, a first modulation scheme used for data transmission to the first communication device and a second modulation scheme used for data transmission to the second communication device; and
adjusts a size of each of the transmission data and the retransmission data, the size adjusted in accordance with the determined first modulation scheme and the determined second modulation scheme.

8. The radio communication station device according to claim 7, wherein:
the transmission controller
reduces the size of the retransmission data and increases the size of the transmission data, if an amount of information per symbol defined in the second modulation scheme is less than an amount of information per symbol defined in the first modulation scheme; and
increases the size of the retransmission data and reduces the size of the transmission data, if the amount of information per symbol defined in the second modulation scheme is larger than the amount of information per symbol defined in the first modulation scheme.

9. The radio communication station device according to claim 2, wherein
if the first priority is higher than the second priority and the second priority is lower than a certain threshold, the transmission controller allocates a radio resource only to the first communication device as well as transmits only the transmission data by use of the allocated radio resource.

10. The radio communication station device according to claim 2, wherein
if the first priority is lower than the second priority, the transmission controller allocates a radio resource only to the second communication device as well as transmits only the retransmission data by use of the allocated radio resource.

11. A radio communication method applied to a radio communication station device which performs radio communication with a plurality of communication devices including a first communication device being a transmission destination of transmission data for which retransmission is not requested, and a second communication device being a transmission destination of retransmission data for which retransmission is requested, the radio communication method comprising:
a step A of setting for each of the communication devices a priority based on a receiving quality of a signal received from each of the reception devices; and
a step B of controlling a data transmission to each of the reception devices based on the priority, wherein
the step A includes a step of setting the priority higher as the receiving quality is higher,
the step B includes, if a first priority set for the first communication device is higher than a second priority set for the second communication device, a step of transmitting the transmission data to the first communication device and the retransmission data to the second communication device by one radio resource such that the first communication device and the second communication device share the one radio resource.

* * * * *